Jan. 10, 1928.  
E. MAY, JR., ET AL  
1,655,731  
PLANT PROPAGATING DEVICE  
Filed July 15, 1927

Inventor  
Eugene May, Jr.  
Robert J. Bullen

Attorney

Patented Jan. 10, 1928.

1,655,731

UNITED STATES PATENT OFFICE.

EUGENE MAY, JR., OF WASHINGTON, DISTRICT OF COLUMBIA, AND ROBERT J. BULLEN, OF ARLINGTON, VIRGINIA, ASSIGNORS TO THE GOVERNMENT AND THE PEOPLE OF THE UNITED STATES OF AMERICA.

PLANT-PROPAGATING DEVICE.

Application filed July 15, 1927. Serial No. 206,076.

(GRANTED UNDER THE PROVISIONS OF THE ACT OF MARCH 3, 1883, 22 STAT. L., 625.)

This application is made under the act of March 3, 1883, chapter 143 (22 Stat. 625) and the invention herein described and claimed may be used by the Government of the United States or any of its officers or employees in the prosecution of work for the Government, or by any other person in the United States, without payment to us of any royalty thereon.

Many plants which have been grown for cuttings only with considerable difficulty can be readily propagated by ringing the bark of a branch or twig to develop roots while it is still attached and receiving its nourishment from the main trunk of the plant. After roots are formed, the twig can then be severed from the plant and the rooted cutting can be potted or otherwise planted.

Ringing the bark of a tree and packing moist Sphagnum over the cut, then wrapping the moist Sphagnum in place is the procedure frequently followed, but great difficulties are encountered in properly adjusting the moisture of the Sphagnum thus attached and in providing satisfactory air supply.

We have devised a convenient detachable box which greatly simplifies this method of propagation and renders the control of the moisture amply accurate. The box as proposed may be made of any practicable size, but for the size of twigs most used for propagation boxes ranging from 1 to 2½ inches in two dimensions and from 3 to 5 inches in the other dimension are the most convenient.

In the accompanying drawing like numerals of reference indicate similar parts in the several views and wherein.

Figure 1:
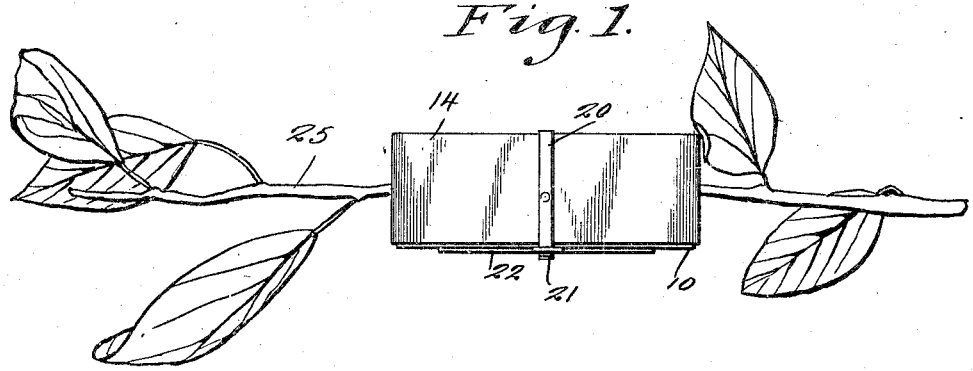
Figure 1 is a view in elevation showing how the box is used.
Figure 2:
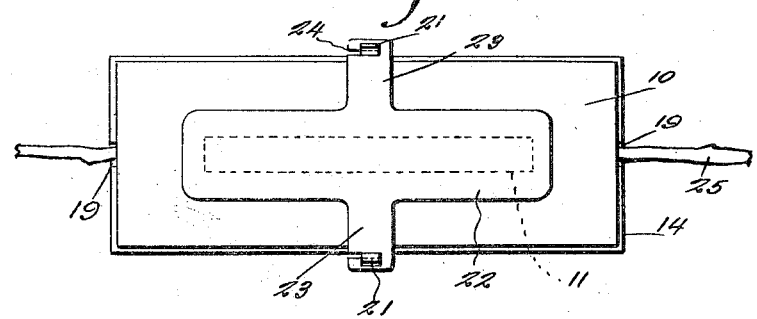
Figure 2 is a bottom plan view.
Figure 3:
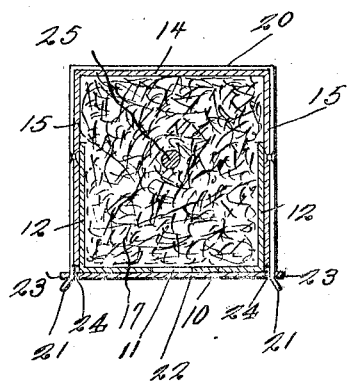
Figure 3 is a vertical transverse sectional view.
Figure 4:
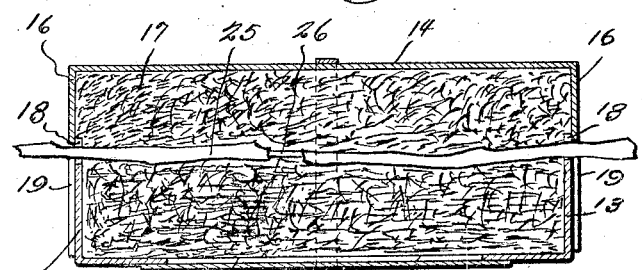
Figure 4 is a vertical longitudinal sectional view.

The invention consists of a box which may be constructed of any suitable water-proof material, and may also vary in size and configuration without departing from the inventive idea. The box preferably includes a bottom 10 having a longitudinal slot 11, the purpose of which will be hereinafter set forth, and also opposed side and end walls 12 and 13 respectively. The cover for the box is indicated at 14 and includes opposed side and end walls 15 and 16 respectively, the cover being of a size to completely receive the body of the box as clearly illustrated in the drawing. Both the body of the box and the top therefor are adapted to be packed with moistened Sphagnum or some other suitable absorbent material 17. It will be noted upon inspection of Figure 4 that the end walls 13 of the body of the box are provided with notches 18, while the corresponding end walls 16 of the cover are provided with slots 19, the latter opening at the lower edges of said end walls, this construction permitting the twig to be arranged within the box and the cover arranged in position as illustrated in Figure 4.

Any suitable means may be employed for clamping the cover and box together, but as illustrated in this specific embodiment of the invention, we employ a substantially U-shaped member 20 which straddles the cover 14 of the box and has its free ends 21 projecting beyond the lower edges of the cover and slightly offset. A plate 22 is arranged along the bottom of the box and is of a size to completely cover the slot 11 formed in the bottom 10. Projecting laterally from the plate 22 are extensions 23, each having a slot 24 adapted to receive the adjacent offset extremity 21 of the U-shaped member.

In practice, the twig 25 to be propagated is ringed as at 26, and both the box and cover together with the absorbent material contained therein, are dipped in water. The twig 25 is then arranged longitudinally of the box and arranged in the notches 18 of the end walls thereof, and the cover 14 placed over the box as illustrated. As the cover is arranged in position, the twig is received by the slots 19. The plate 22 is then arranged upon the bottom of the box in engagement with the offset extremities 21 of the U-shaped member, thereby clamping the cover on the box, and at the same time covering the slot 11 in the bottom thereof. The plate 22 may if desired, be removed from time to time to moisten the absorbent material, and also to permit examination of the progress of the growth on the twig 25.

While it is believed that from the foregoing description the nature and advantages of the invention will be readily understood, we desire to have it known that such changes in construction and arrangement of parts may be resorted to when desired, as fall within the scope of what is claimed.

What is claimed is:

1. A plant propagating device comprising a box filled with moistened absorbent material, and having notches in the opposed end walls to receive the twig of a plant when arranged upon said moistened material, a cover for said box having slots in the end walls thereof to receive the twig when the cover is placed upon the box, and means for clamping the cover and box together.

2. A plant propagating device comprising a box filled with moistened absorbent material, the end walls of the box having notches adapted to receive the twig of a plant reposing upon said absorbent material, a cover for the box having slots in the ends thereof to receive said twig when the cover is placed in position, said cover also containing moistened absorbent material, said box having a longitudinal slot in the bottom thereof, a plate arranged against said bottom for closing the slot, and cooperating means carried by the cover and said plate for clamping the cover on the box.

EUGENE MAY, Jr.
ROBERT J. BULLEN.